US006430000B1

(12) United States Patent
Rent

(10) Patent No.: US 6,430,000 B1
(45) Date of Patent: Aug. 6, 2002

(54) HERMETICALLY SEALED PLURAL DISK DRIVE HOUSING

(75) Inventor: Thomas M. Rent, Lakeville, MN (US)

(73) Assignee: General Dynamics Information Systems, Inc., Bloomington, MN (US)

( * ) Notice: Subject to any disclaimer, the term of this patent is extended or adjusted under 35 U.S.C. 154(b) by 0 days.

(21) Appl. No.: 09/548,456

(22) Filed: Apr. 13, 2000

(51) Int. Cl.$^7$ ............................................... G11B 33/14
(52) U.S. Cl. ..................... 360/97.03; 361/685
(58) Field of Search .................... 360/97.01, 97.02, 360/97.03, 98.01, 900; 361/685

(56) References Cited

U.S. PATENT DOCUMENTS

| | | | |
|---|---|---|---|
| 4,988,890 A | * | 1/1991 | Narhi et al. |
| 5,021,905 A | | 6/1991 | Sleger ...................... 360/97.02 |
| 5,206,772 A | * | 4/1993 | Hirano et al. ............ 360/98.01 |
| 5,241,438 A | * | 8/1993 | Matsushima et al. |
| 5,264,975 A | * | 11/1993 | Bajorek et al. .......... 360/97.01 |
| 5,291,355 A | | 3/1994 | Hatch et al. ............. 360/97.01 |
| 5,446,609 A | | 8/1995 | Thanos et al. ........... 360/97.02 |
| 5,454,157 A | | 10/1995 | Ananth et al. ........... 360/97.03 |
| 5,481,296 A | * | 1/1996 | Cragun et al. |
| 5,510,954 A | * | 4/1996 | Wyler ........................ 361/685 |
| 5,689,386 A | | 11/1997 | Morehouse et al. ..... 360/97.02 |
| 5,696,648 A | | 12/1997 | Jeong et al. ............. 360/97.02 |
| 5,708,668 A | * | 1/1998 | Styczinski |
| 6,035,429 A | | 3/2000 | Shafé ........................ 714/718 |
| 6,168,459 B1 | * | 1/2001 | Cox et al. ................ 360/97.01 |

* cited by examiner

*Primary Examiner*—Craig A. Renner
(74) *Attorney, Agent, or Firm*—Jenner & Block, LLC

(57) ABSTRACT

A device for storage of electronic data has a sealed hard drive component that can be mounted directly to a circuit board. The device can house a plurality of individual hard drives in a stacked configuration. The stacked hard drives are encased within a hermetically sealed housing, the exterior of which has connectors suitable for mounting directly to a circuit board. At least two of the hard drives encased within the housing can be controlled by a single hard drive controller located inside or outside the housing.

15 Claims, 3 Drawing Sheets

HERMETICALLY SEALED PLURAL DISK DRIVE HOUSING

BACKGROUND OF THE INVENTION

1. Field of the Invention

The present invention relates to a device for electronic data storage. More particularly, the present invention relates to a magnetic media data storage component having one or more independent hard drives in a stacked or layered configuration that are hermetically sealed within a housing suitable for mounting to a circuit board. The hard drives can be controlled by a single hard drive controller located inside or outside the housing.

2. Description of Related Art

Digital data may be stored electronically on a number of different types of media such as magnetic media. A popular form of magnetic storage media are hard drives. Hard drives are electronic components that are typically installed into larger computer systems. The function of a hard drive is to store digital data generated by a computer so that it can be recalled at a later time by the computer.

A hard drive exchanges data with a computer system's central processing unit ("CPU"). Before data from the CPU is stored on a hard drive, the data is first processed by an electrical component called a hard drive controller. The hard drive controller provides an interface between the hard drive and the CPU that is necessary to determine where and how data will be stored on the hard drive. If more than one hard drive is incorporated into a single computing device, then one hard drive controller is necessary for each hard drive.

Hard drives typically are housed within rigid metallic housings. Included in the hard drive housing is an electronic circuit board onto which the hard drive's electrical components are mounted. The magnetic media onto which data is stored within a hard drive consists of a rigid disk coated with a magnetic material. These rigid disks are referred to in the art as platters. The platter is oriented in the disk drive such that it rotates about a central axis in the same manner as a phonograph or record rotates on a turntable. The rotation of the platter is driven by a high speed electric motor.

A component called a read/write head transfers data to, and from, the platter. The read/write head reads data from the platter by sensing the magnetic fields on the platter. The read/write head writes data to the hard drive by inducing a magnetic field which is recorded on the platter. The read/write head is located at the end of an armature. The armature controls the position of the head relative to the platter. As the armature moves, the read/write head is guided over different positions on the platter. The movement of the armature can be controlled by a high-speed linear motor.

The read/write head does not contact the platter. Rather, a small air gap separates the read/write head from the platter. The gap is maintained by the aerodynamic forces exerted on the read/write head as the platter rotates and causes the air between the platter and read/write head to move. In effect, the read/write head flies above the surface of the platter. Therefore, air must be present inside the hard drive to maintain the aerodynamic forces on the read/write head. If the air pressure within the hard drive housing fluctuates, the gap between the read/write head could close, and the read/write head could contact the platter. If the read/write head contacts the platter, both the read/write head and the platter could be damaged significantly and data could be lost. To avoid fluctuations in air pressure in the hard drive housing, most hard drives are equipped with an air vent which allows for the exchange of air between the hard drive and the environment.

The size of a hard drive can vary. For example, a hard drive for use in a laptop computer may be the size of a deck of playing cards. Other hard drives may be much larger, depending on the design of the hard drive, the application in which it is used and the storage capacity of the hard drive. However, as the demand for faster, more powerful and more compact computers and computing products has increased, the demand for more compact hard drives also has increased. In addition, as computer processors advance in speed and capability, data storage requirements also increase. Therefore, compact hard drives with increased storage capacities are also in high demand.

Several methods have been used to provide more compact hard drives with increased storage capacities. For example, some hard drives feature multiple platters and multiple read/write heads. Other hard drives allow the read/write head to store data on the upper and lower surfaces of each platter in the hard drive. In some applications, several individual hard drives may be connected together by cables in serial sequence to expand storage capacity.

Most compact hard drives have been packaged as modules that are removable from the computer system into which they are installed. PCMCIA and Compact Flash are formats for removable hard drives used, for example, in laptop computers. Other compact hard drives are installed into the computer system and are not intended to be removed from the system. These drives are often mounted to the chassis of the computer system. Wires or ribbon cables connect these drives to the hard drive controller and to the CPU of the computer system into which they are installed.

The hard drives described above have several disadvantages. One disadvantage of hard drives known in the art is that they require special ports and cabling to connect them with the computer systems into which they are installed. These hard drives are not designed for convenient mounting onto a circuit board for use in embedded computers or portable electronics. For example, removable hard drives such as the PCMCIA or Compact Flash hard drives require special ports and connectors to integrate them into computer systems. These ports and connectors consume space in the computer system. Compact hard drives that are permanently installed in computer systems utilize ribbon cables to connect each hard drive to each hard drive controller and central processing unit. These cables complicate installation of the hard drives and other computer components, and consume space in the system.

Another disadvantage of hard drives known in the art is that they are vented to maintain the air pressure in the hard drive housing so that the read/write head flies above the platter. As air passes through these vents, micro-particles such as dust and spores and other contaminants also enter the hard drive housing. Therefore, vented hard drives are not suitable for use in micro-particle contaminated environments. In addition, vented hard drives cannot operate in high or low pressure environments because the air pressure within the hard drive housing fluctuates with the air pressure of the environment. If a hard drive is operated in a low air pressure environment, for example, the air gap between the read/write head and the platter could close, resulting in damage to the hard drive and data loss.

Another disadvantage of the hard drives known in the art is that if several hard drives are to be installed in a computer system, one controller for each hard drive also must be installed into the system, which is costly and space consuming.

SUMMARY OF THE INVENTION

Therefore, it is one object of the present invention to provide a hard drive component for electronic data storage that can be mounted directly to a circuit board in the same fashion that other electrical components are mounted to circuit boards.

It is another object of this invention to provide a hard drive component for electronic data storage that is capable of operating in environments in which micro-particle contaminants are present.

It is another object of this invention to provide a hard drive component for electronic data storage that is capable of operating in a high or low air pressure environment.

It is another object of this invention to provide a hard drive component for electronic data storage that is compact and has increased storage capacity.

It is yet another object of this invention to provide a hard drive component for electronic data storage in which several hard drives are combined into a single unit that interfaces with the computer via a single hard drive controller.

The present invention is a device for electronic data storage that can be in the form of a stackable sealed hard drive component. The device of the present invention can comprise a plurality of hard drives, each of which includes an electrical connector and a hard drive connecting means for connecting the hard drives to one another in a stack with a first end and a second end. The hard drives can be contained in a housing having a top section and a bottom section that is hermetically sealed to the top section, such that the housing hermetically seals the hard drives. The first end and the second end of the hard drive stack can be connected to the housing using a housing connecting means. An electrical terminal means can mount the housing directly to a circuit board and a connecting lead can electrically connect the electrical terminal means to the hard drive electrical connectors. A hard drive controller can control at least two of the hard drives. The hard drive controller optionally can control all of the hard drives and can be located inside or outside the housing. The hard drives can be microdrives.

In another embodiment of the invention, the device comprises a plurality of hard drives and a hard drive controller for controlling at least two, or as many as all, of the hard drives. The device can include a housing for containing and hermetically sealing the hard drives. The housing can include a top section and a bottom section that is hermetically sealed to the top section. The hard drive controller can be located inside or outside the housing.

In another embodiment of the invention, the device comprises a plurality of hard drives, each of which includes an electrical connector, a hard drive connecting means for connecting the hard drives to one another in a stack having a first end and a second end, a housing for containing and hermetically sealing the hard drives, and a housing connecting means for connecting the first end and the second end of the hard drive stack to the housing. Each hard drive can include a hard drive electrical connector. The device can include an electrical terminal means for mounting the housing directly to a circuit board and a connecting lead for electrically connecting the electrical terminal means to the hard drive electrical connector.

In another embodiment of the invention, the device comprises at least one hard drive and electrical terminal means for electrically connecting and mounting the hard drive directly to a circuit board. Each hard drive can also include a hard drive electrical connector. The device can include a connecting lead for electrically connecting the electrical terminal means to the hard drive electrical connector.

In yet another embodiment of the invention, the device comprises at least one hard drive and a housing for containing and hermetically sealing the hard drive or hard drives. The hard drives can be microdrives. The housing can include a top section and a bottom section that is hermetically sealed to the top section.

The device of the present invention overcomes the limitations associated with the hard drives known in the art. The device of the present invention provides a hard drive component for electronic data storage that can be mounted directly to a circuit board in the same fashion that other electrical components such as integrated circuits are mounted to circuit boards, thereby saving space. The device of the present invention also provides a hard drive component for electronic data storage that is contained within a hermetically sealed container. Because the housing is hermetically sealed, the air pressure inside the housing remains constant, regardless of the air pressure of the surrounding environment. Therefore, the hard drive component can be used in applications where the environmental air pressure varies. The sealed housing also prevents contamination of the hard drives from the environment by micro-particles such as dust. The device of the present invention also provides a hard drive component for electronic data storage that has increased storage capacity because several hard drives are stacked into a single unit. The resulting stack of hard drives consume less space than would independently installed hard drives. The device of the present invention also provides a hard drive component for electronic data storage in which several hard drives are combined into a single unit that interfaces with the computer via a single hard drive controller, thereby reducing cost and decreasing the physical space the hard drive component consumes.

DETAILED DESCRIPTION OF THE PREFERRED EMBODIMENT

A stackable sealed hard drive component ("hard drive component") 8 for providing electronic data storage according to the present invention is shown in FIGS. 1–4. The device of the present invention provides a high capacity electronic data storage component that packages a plurality of independent hard drives into a hermetically sealed housing suitable for mounting to an electronic circuit board.

Figure 1:
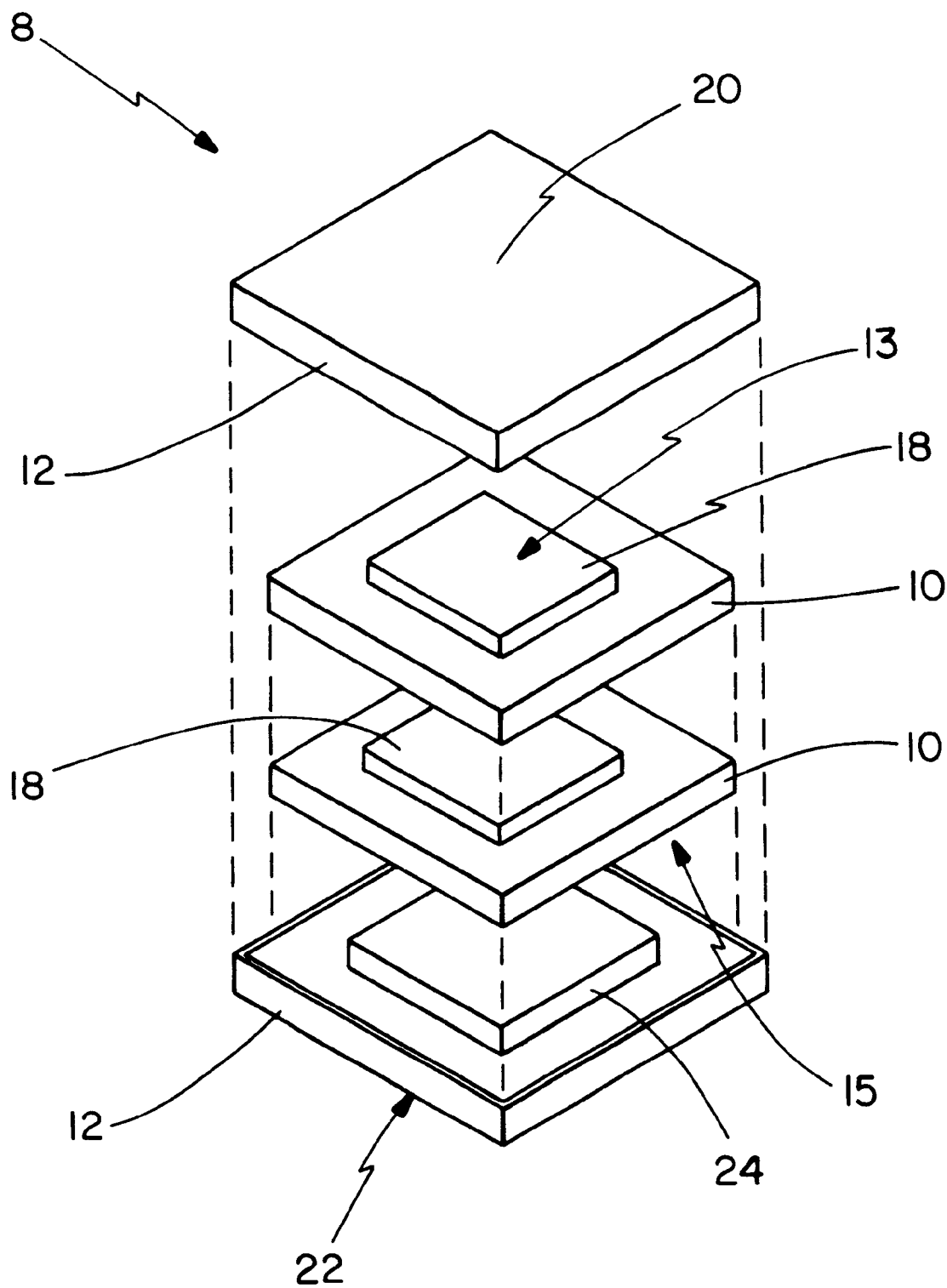
FIG. 1 is an exploded view of a hard drive component for electronic data storage according to the present invention.

Referring to FIG. 1, in the preferred embodiment of the present invention, hard drive component 8 includes a plurality of independent hard drives 10. Two independent hard drives 10 are shown in FIG. 1, however, hard drive component 8 may include any number of independent hard drives 10, including one. The number of drives 10 to be combined in hard drive component 8 is defined by factors including the amount of electronic data storage necessary, the amount of physical space available in the system in which hard drive component 8 is installed, the nature of the application in which hard drive component 8 will be used and the electronic data storage capacity of each individual hard drive 10. Preferably, each individual hard drive 10 is a type of hard drive referred to as a microdrive. Microdrives are compact-sized hard drives capable of high capacity electronic data storage. Preferably, the microdrives have a platter diameter of 1.5 inches or smaller. A suitable individual hard drive 10 is an IBM Model DMDM-10340 Microdrive. However, hard drives of any suitable size, capacity and style may be incorporated into hard drive component 8.

As shown in FIG. 1, hard drives 10 are arranged in a stacked or layered configuration within a housing 12. Hard drive connecting means 18 connect adjacent hard drives to each other in the stack, thereby forming an integral stack of hard drives. The stack of hard drives has a first end 13 and a second end 15. Hard drive connecting means 18 can include, e.g., screws, snap connectors, or other materials such as silicon adhesive, isoloss, piezo-ceramics or combinations thereof. Materials such as silicon adhesive provide the added benefit of dampening shock and vibration transmissions between each of the individual hard drives 10. Isoloss is a material that dampens vibrations by converting the kinetic energy carried in vibrations into thermal energy which is dissipated by means such as conduction. Piezo-ceramic materials convert the kinetic energy carried in vibrations into electricity which can be dissipated or distributed back into the system. Preferably, hard drive connecting means 18 is a combination of an adhesive material and an isoloss material referred to as ISODAMP C-1002, which is manufactured by AearoCompany, 5457 West 79th Street, Indianapolis, Ind. 46268 (317/692-6666).

Figure 2:
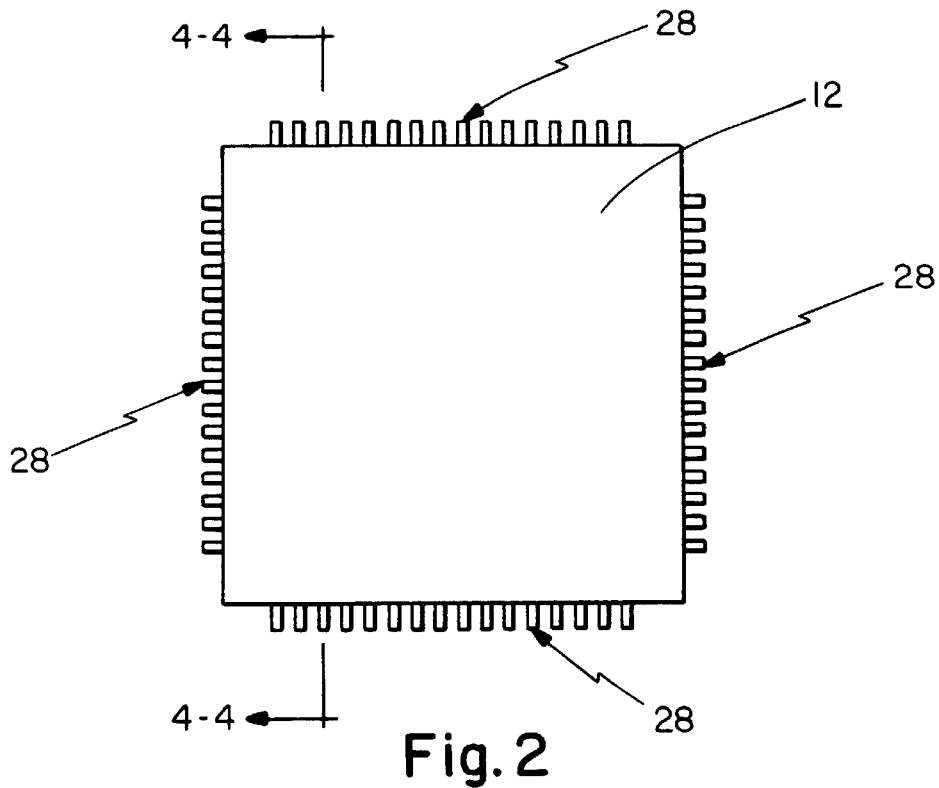
FIG. 2 is a top view of a hard drive component for electronic data storage according to the present invention.
Figure 3:
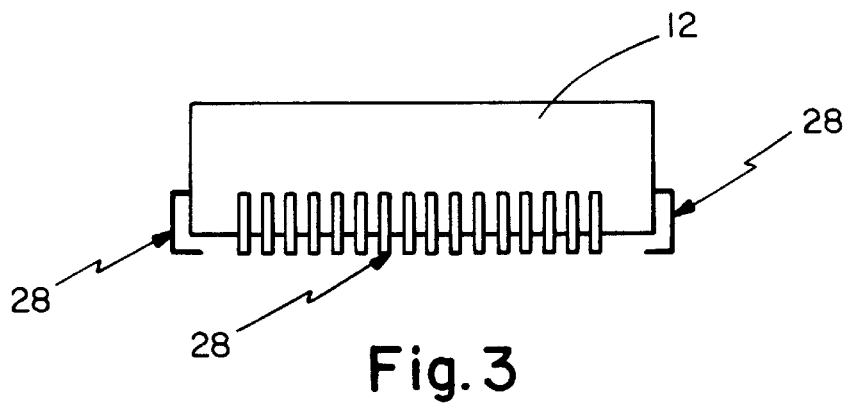
FIG. 3 is a side view of a hard drive component for electronic data storage according to the present invention.
Figure 4:
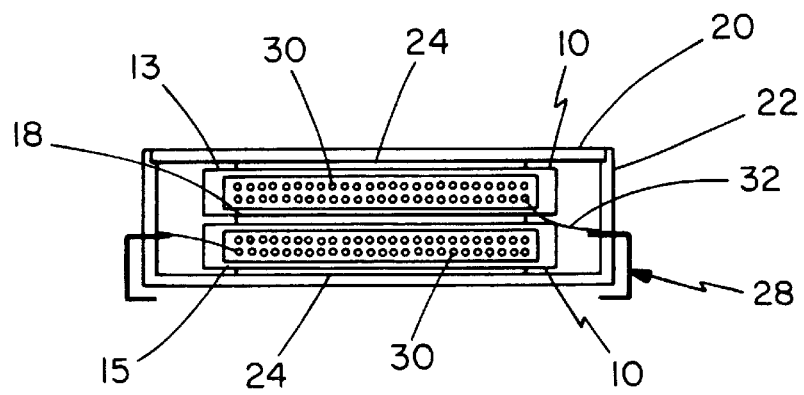
FIG. 4 is sectional view along line 4—4 of FIG. 2 of a hard drive component for electronic data storage according to the present invention.
Figure 5:
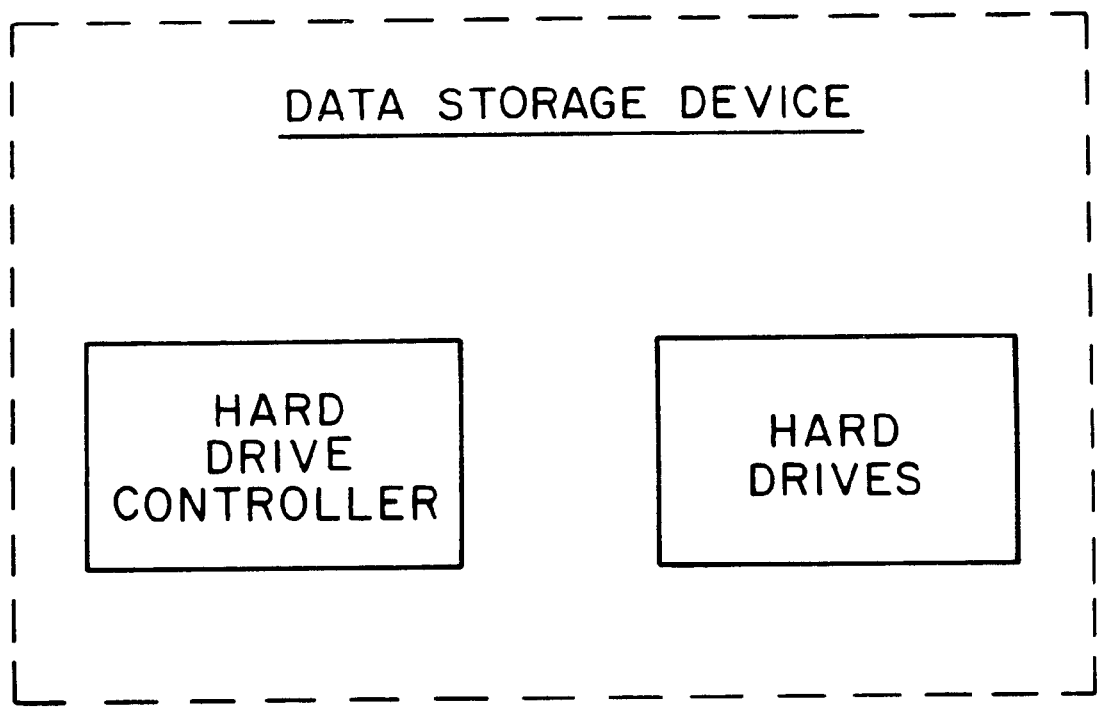
FIG. 5 is a block diagram showing the components of the data storage device.

Referring now to FIGS. 2–4, stacked individual hard drives 10 are contained within housing 12. Housing 12 encapsulates the stack of hard drives 10 and hermetically seals the stack from the environment. Housing 12 may be constructed of metal, plastic or any other material capable of being hermetically sealed. According to the preferred embodiment of the invention, housing 12 includes a top section 20 and a bottom section 22. Top section 20 and bottom section 22 preferably are constructed of metal and laser welded together to hermetically seal individual drives 10 from the environment.

The stack of individual hard drives 10 is mounted inside housing 12 by housing connecting means 24. According to the preferred embodiment of the invention, housing connecting means 24 joins first end 13 of the stack of individual hard drives 10 with top section 20 of housing 12. Similarly, housing connecting means 24 joins second end 15 of the stack of individual drives 10 with bottom section 22 of housing 12. In another embodiment of the invention, housing connecting means 24 only joins first end 13 with top section 20 of housing 12. In another embodiment of the invention, housing connecting means 24 only joins second end 15 with bottom section 22 of housing 12. Housing connecting means 24 may include the same materials suitable for hard drive connecting means 18, e.g., screws, snap connectors, or other materials such as silicon adhesive, isoloss, piezo-ceramics or a combination thereof. According to the preferred embodiment of the invention, housing connecting means 24 is a combination of an adhesive material and ISODAMP C-1002.

Referring to FIG. 4, each individual hard drive 10 must be electrically connected to the computer system to receive power and to exchange electronic data with the computer system. Housing 12 includes electrical terminal means 28 for electrically connecting individual hard drives 10 to the computer system. Electrical terminal means 28 provide the electrical connection between individual drives 10 that are hermetically sealed within housing 12 and a circuit board outside of housing 12. According to the preferred embodiment of the invention, electrical terminal means 28 are U-shaped metal leads that are molded into bottom section 22 of housing 12. A portion of each electrical terminal means 28 extends into the interior of housing 12, and another portion of each electrical terminal means 28 extends external to housing 12.

The electrical connection between individual hard drives 10 and electrical terminal means 28 according to the preferred embodiment of the invention is shown in FIG. 4. Each individual hard drive 10 includes a hard drive electrical connector 30. The portion of each electrical terminal means 28 extending into the interior of housing 12 is electrically connected via connecting leads 32 to a specific hard drive electrical connector 30 on an individual hard drive 10. The configuration of the electrical connections between hard drive electrical connectors 30 and electrical terminal means 28 depends on the design and number of individual hard drives 10, and the design and number of electrical terminal means 28. For example, there may be a single connecting lead 32 or a plurality of connecting means 32 for connecting each individual hard drive 10 to electrical terminal means 28.

The portion of electrical terminal means 28 that extend external to housing 12 can be mounted directly to a circuit board by soldering or by fitting electrical terminal means 28 into an integrated circuit-type socket that is mounted to a circuit board or printed wiring board. Electrical terminal means 28 preferably are U-shaped metal leads, but also may include, e.g., pin, ball or contact pad grid arrays. A pin grid array includes a plurality of pins protruding from the bottom of housing 12 that are accepted by connectors on the circuit board onto which the apparatus of the present invention is installed. A ball grid array is similar to the pin grid array configuration, except that portions of ball-shaped conductors protrude from the bottom of housing 12 and are accepted by suitable connectors on the circuit board. A contact pad array consists of conducting pads protruding from the bottom of housing 12 that align and connect with similarly situated conducting pads on the circuit board when the apparatus of the present invention is mounted to the circuit board. Electrical terminal means 28, as described, electrically connect hard drive component 8 to the computer system. Electrical terminal means 28 can also be connected via electrical cables to the computer system, rather than, e.g., fitting them into an integrated circuit-type socket that is mounted to a circuit board or printed wiring board.

According to the preferred embodiment of the present invention, individual hard drives 10 are connected via electrical terminal means 28 to a hard drive controller (not shown) located outside of housing 12. In another embodiment of the invention, the hard drive controller is mounted inside housing 12.

The foregoing describes a device according to the present invention that overcomes the limitations of other devices known in the art by providing a high capacity electronic data storage component that packages a plurality of independent hard drives into a hermetically sealed housing suitable for mounting to an electronic circuit board.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A data storage device, comprising:
   a plurality of hard drives;
   a hard drive controller for controlling at least two of said hard drives; and
   a housing for containing said hard drives, wherein said housing hermetically seals said plurality of hard drives.

2. The device of claim 1 wherein said housing includes a top section and a bottom section, said top section being hermetically sealed to said bottom section.

3. The device of claim 1 wherein said hard drive controller is located inside of said housing.

4. The device of claim 1 wherein said hard drive controller is located outside of said housing.

5. The device of claim 1 wherein said hard drive controller controls all of said hard drives.

6. A data storage device, comprising:
   a plurality of hard drives;
   hard drive connecting means for connecting said hard drives to one another in a stack, said stack having a first end and a second end;
   a housing for containing and hermetically sealing said plurality of hard drives; and
   housing connecting means for connecting said first end and said second end of said stack of hard drives to said housing.

7. The device of claim 6 wherein each of said hard drives includes a hard drive electrical connector.

8. The device of claim 7 including electrical terminal means for mounting said housing directly to a circuit board and a connecting lead for electrically connecting said electrical terminal means to said hard drive electrical connector.

9. The device of claim 6 wherein said hard drives are microdrives.

10. The device of claim 6 wherein said housing includes a top section and a bottom section, said top section being hermetically sealed to said bottom section.

11. A data storage device, comprising:
    a plurality of hard drives, wherein at least one of said hard drives includes a hard drive electrical connector;
    hard drive connecting means for connecting said hard drives to one another in a stack, said stack having a first end and a second end;
    a housing for containing said plurality of hard drives, wherein said housing includes a top section and a bottom section, said top section hermetically sealed to said bottom section, and wherein said housing hermetically seals said plurality of hard drives;
    housing connecting means for connecting said first end and said second end of said stack of hard drives to said housing;
    electrical terminal means for mounting said housing directly to a circuit board;
    a connecting lead for electrically connecting said electrical terminal means to said hard drive electrical connector; and
    a hard drive controller for controlling at least two of said hard drives.

12. The device of claim 11 wherein said hard drive controller is located inside of said housing.

13. The device of claim 11 wherein said hard drive controller is located outside of said housing.

14. The device of claim 11 wherein said hard drives are microdrives.

15. The device of claim 11 wherein said hard drive controller controls all of said hard drives.

* * * * *